(12) United States Patent
Hartal et al.

(10) Patent No.: US 7,166,315 B2
(45) Date of Patent: Jan. 23, 2007

(54) TOMATO FIBER COMPOSITION, USES THEREOF AND PROCESS FOR ITS PREPARATION

(75) Inventors: Dov Hartal, Tel Aviv (IL); Tanya Sedlov, Beer Sheva (IL); Morris Zelkha, Omer (IL)

(73) Assignee: Lycored Natural Products Industries Ltd., Beer Sheva (IL)

( * ) Notice: Subject to any disclaimer, the term of this patent is extended or adjusted under 35 U.S.C. 154(b) by 118 days.

(21) Appl. No.: 10/380,532

(22) PCT Filed: Sep. 13, 2001

(86) PCT No.: PCT/IL01/00868

§ 371 (c)(1),
(2), (4) Date: Mar. 17, 2003

(87) PCT Pub. No.: WO02/21935

PCT Pub. Date: Mar. 21, 2002

(65) Prior Publication Data

US 2005/0013920 A1 Jan. 20, 2005

(30) Foreign Application Priority Data

Sep. 17, 2000 (IL) ..................... 138515

(51) Int. Cl.
*A23L 1/212* (2006.01)
*A23L 1/15* (2006.01)

(52) U.S. Cl. ..................... 426/615; 426/429; 426/478; 426/640

(58) Field of Classification Search ............... 426/615, 426/640, 478, 429
See application file for complete search history.

(56) References Cited

U.S. PATENT DOCUMENTS 4,241,093 A * 12/1980 Farag et al. ............... 426/258
4,451,489 A   5/1984 Beale et al.
5,229,160 A * 7/1993 Lang ......................... 426/615
5,510,551 A * 4/1996 Graves et al. .............. 585/351
5,837,311 A * 11/1998 Zelkha et al. ............. 426/651

FOREIGN PATENT DOCUMENTS

| DE | 100 35 693 A1 | 1/2002 |
| EP | 0 478 401 A2 | 4/1992 |
| WO | WO 95/16363 | 6/1995 |
| WO | WO 97/48287 A1 | 12/1997 |

OTHER PUBLICATIONS

R.R. Selvendran, et al. "Dietary Fiber: Chemistry, Analysis, and Properties", Advances in Food Research, vol. 31; (1987); pp. 117-206.

Sharma et al. "Molecular Characterization, Physico-chemical and Functional Properties of Tomato Fruit Pectin", Food Research International, vol. 30, No. 7, (1998); pp. 543-547.

Vitacel, "Tomatenfaser" Internet, "Online! XP002209428 <URL: http://www.jrs.de/de/jrs/german/nm/tomato.htm> retrieved Aug. 9, 2002!".

Weber et al. "Binding Capacity of 18 Fiber Sources for Calcium", J. Agric. Food Chem., vol. 41, (1993), pp. 1931-1935.

* cited by examiner

*Primary Examiner*—Helen Pratt
(74) *Attorney, Agent, or Firm*—Browdy and Neimark, PLLC

(57) ABSTRACT

The present invention provides a composition comprising dietary fibers with high water holding capacity (WHC) wherein said composition is obtained from tomato pulp which is substantially free of see, peels, carotenoids and lipids and exhibits WHC, in weight ratio, in the range of about 1:13 to 1:60. The present invention further provides the use of the composition of the present invention as a texturing, bulking, viscosity controlling or syneresis-preventing agent for food. The present invention further provides a process for preparing said composition.

20 Claims, No Drawings

TOMATO FIBER COMPOSITION, USES THEREOF AND PROCESS FOR ITS PREPARATION

The present application is the U.S. National phase, i.e. a 371, of PCT/IL01/00868, filed Sep. 13, 2001.

FIELD OF THE INVENTION

The present invention relates to the field of food additives and food processing. Particularly, to a novel fiber composition, uses thereof and a process for its preparation.

BACKGROUND OF THE INVENTION

The field of food additives/supplements, particularly texturizing agents, viscosity controlling agents and bulking agents is a very diverse field. Texture of a food product is an important parameter that defines its sensory parameters. In the food processing industry, in order to obtain desired texture and other desired effects such as syneresis prevention, it is often required to add certain agents, such as viscosity controlling agents. Viscosity is a very important parameter in a food product and often is defined in the specifications of the product. The analytical measure of viscosity is commonly defined in cp. However, this provides only a partial requirement, and other texture parameters are determined by organoleptic parameters. By organoleptic parameters it is meant parameters that are determined by our senses (sensory evaluation) such as taste, color, texture, mouth feel, and the like. These cannot be determined with instruments and are defined by a sensory panel. Commonly used viscosity controlling agents, e.g., gums, may often render the product with a sticky texture which is often undesirable. Thus, it is important to regulate viscosity of a food product without effecting a sticky mouth feel. Said sticky mouth feel, also described as gluey or slimy and can also be referred to as a "long texture". Many of the additives currently used in the food industry as texture modifiers affect viscosity and contribute slimy "long" texture.

A wide array of texturizing, viscosity controlling and bulking agents has been developed for the food industry. Certain agents that are used by the food industry to control viscosity and texture are synthetic materials or natural derivatives that were modified by chemical means (starch derivatives, certain gums, etc.). An important group of said agents is the group of agents based on dietary fibers. Although there is no exact definition of dietary fiber, it is commonly acceptable that dietary fiber comprises as a main constituent plant cell wall material, mostly polysaccharides. Dietary fibers have good water holding capacity, which renders them good agents for viscosity and texture control of food. The properties of dietary fiber have been extensively reviewed, Selevendran et al, *Advances in Food Research*, (1987) vol. 31, pp. 117–209. The uses of various commercially available dietary-fiber-based additives as texturizing, viscosity and bulking agents is well known. Some of these agents such as pectin, guar gum and carrageenan when used in controlling the texture and viscosity, render the food with a slimy texture. There are foods wherein this slimy texture is an undesirable characteristic. Thus, there is a need to use agents which do not provide such a slimy texture. The source of the dietary fiber used as the agent has been found to be an important factor in determining the texture obtained when using them. U.S. Pat. No. 4,241,093 discloses a process for preparing dietary fiber compositions from vegetable pulp, which are useful as bulking and texturing agents. U.S. Pat. No. 4,451,489 more specifically discloses a dietary based composition as a bulking agent and a process for its preparation, wherein said composition does not provide a slimy texture and is prepared from sugar beet pulp. WO 97/48287 by the present applicant discloses a composition based on dietary fiber obtained from tomato pulp. However, the water holding capacity (hereinafter WHC) of the disclosed fiber composition is limited to about 1:12 (weight ratio). Hence, when using said composition as a texturizing agent or viscosity-controlling agent, relatively large amounts of said composition are required. This is a substantial disadvantage due to the negative effect such amounts of additive may have on the food product. The improvement of the WHC of the dietary fiber is advantageous. Said improvement, i.e. increasing the WHC of the fiber composition, allows for the use of less texturizing agent for achieving the desired texture and thus avoiding the aforementioned negative effect.

Certain food products (spreads, sauces, ketchup etc.) are plagued by water separation. The water separates from the formulation and forms an aqueous phase on top of the food product. This of course is an undesired effect which is termed as syneresis. It is important to prevent this phenomenon by certain additives that bind water to the food product and prevent its separation.

In view of the aforementioned there is a long felt need to develop a dietary fiber composition with improved water holding capacity which provides viscosity control and texture control, which overcomes the disadvantages of the dietary fiber compositions currently employed. Furthermore there is a long felt need for a food additive which inhibits or prevents syneresis.

It is therefore a purpose of the present invention to provide a dietary fiber composition with improved water holding capacity.

It is yet a further purpose of the present invention to provide a dietary fiber composition with improved water holding capacity which is a good texturizing and viscosity controlling agent.

A further purpose of the present invention is to provide a food additive which is effective inpreventing syneresis.

It is an additional purpose of the present invention to provide a novel bulking agent.

It is another purpose of the present invention to provide a process for preparing a dietary fiber composition derived from tomatoes, of improved WHC.

It is yet a further purpose of the present invention to provide a composition that overcomes the disadvantages of the known art.

Other objects and advantages of the invention will become apparent as the description proceeds.

SUMMARY OF THE INVENTION

The present invention provides a composition comprising dietary fibers with high water holding capacity (WHC) wherein said composition is obtained from tomato pulp which is substantially free of seeds, peels, carotenoids and lipids and exhibits WHC, in weight ratio, in the range of about 1:13 to 1:60. The present invention further provides the use of the composition of the present invention as a texturizing, bulking, viscosity controlling or syneresis-preventing agent for food.

Further provided by the present invention is a process for preparing the present composition comprising the following steps:

1. pretreating tomatoes by conventional unit operations, including washing, sorting and crushing.

2. Separating the peel and seeds of the tomato from the crushed tomatoes.
3. Subjecting the crushed tomatoes to heat treatment
4. Separating the crushed tomatoes into serum and pulp, to obtain fine pulp.
5. Extracting carotenoids and lipids from the fine pulp obtained in step 4.
6. Drying the extracted fine pulp.

Optionally, the peel and seeds may be separated at any stage before extraction and drying.

DETAILED DESCRIPTION OF A PREFERRED EMBODIMENT OF THE INVENTION

The following description is illustrative of preferred embodiments of the invention. The following description is not to be construed as limiting, it being understood that the skilled person may carry out many obvious variations to the process.

Process operations similar to the operations carried out in the process disclosed in WO 97/48287 incorporated herein by reference, are conducted under similar conditions and parameters. The dehydrated pulp obtained from the spent pulp according to the process disclosed in WO 97/48287 displays a WHC weight ratio of about 1:12. By WHC weight ratio it is meant the number of weight parts of water absorbed in a single weight part of fiber or dehydrated pulp. Thus, it has been surprisingly found that fiber obtained from tomato pulp according to the process of the present invention, hereinafter referred to as tomato fiber, from which substantially all the lipids and carotenoids have been removed, exhibit substantially higher water absorbency than the dehydrated pulp obtained according to WO 97/48287. The tomato fiber is therefore an effective texturizng, viscosity control and bulking agents for food. Furthermore, it has surprisingly been found that the tomato fiber of the present invention is an effective syneresis-preventing agent. It has further been found that the texture of the food obtained from the addition of the composition of the present invention is not a slimy (long) texture, but rather a texture similar to the texture of applesauce or pureed baby food, referred to hereinafter as "short" texture. It has further surprisingly been found that the fiber compositions of the present invention, which are obtained from the extracted fine pulp have an extended shelf life when compared to other similar compositions texturizing According to an embodiment of the process of the present invention, tomatoes are washed and sorted to remove foreign bodies, and green or damaged fruit. The washed tomatoes are then crushed and screened again to remove any coarse waste materials such as stems and the like.

The peels and the seeds of the crushed tomatoes are then separated from the crushed tomatoes, obtaining fine crushed tomatoes. Separation is preferably effected by straining the crushed tomatoes through a fine mesh of about 2 mm Other methods of separating can be effected as will be appreciated by the skilled artisan.

The fine crushed tomatoes are then subjected to heat treatment. The fine crushed tomatoes are heated to a temperature of about 80° C.–110° C., preferably by heat exchangers, and then separated to serum and fine pulp. Separation of the fine pulp from the serum is conducted by centrifugation as disclosed in WO 97/48287.

Following the separation stage, carotenoids and lipids are extracted from the fine pulp to obtain, after solvent removal, tomato fibers substantially free of lipids, carotenoids, seeds and peels. Said solvent may be removed by azeotropic distillation.

The tomato fiber obtained is dried, preferably at a temperature of about 100° C.–120° C. to obtain a tomato fiber composition with a WHC weight ratio of about 1:13–1:30.

According to an additional embodiment of the invention the tomato fiber obtained subsequent to the extraction stage is dried by fluidized bed drying, hence removing the extraction solvent as well as dehydrating. Thus, obtaining a tomato fiber composition with improved WHC weight ratio of about 1:30 to 1:60.

According to yet a further embodiment of the present invention the tomato fiber composition obtained from tomatoes according to the present process are added to food in order to control the texture of the food. The texture of the food obtained is similar to the texture of apple puree, rather than slimy texture as obtained with other dietary fiber texturizing compositions. Said tomato fiber composition may be added to foods such as sauces, spreads, ground meat, soups etc. The amount added depends on the product and desired effect but is generally up to about 10%, preferably 2%–5% by weight.

According to yet a further embodiment of the invention the fiber compositions of the present invention are added to food to control the viscosity of the food. Control of the viscosity of the food is achieved by the control of the amount of fiber composition added. Said composition is usually added to the food during the production process with the water added or within the food mixture itself.

The tomato fiber composition of the present invention has low caloric value. Accordingly, In yet an additional embodiment of the invention the fiber composition is used as a bulking agent in food which also serves as a source of dietary fiber. Said composition is used as an additive in foods where a bulking effect is required. The addition of said composition is beneficial and is effective for supplementing food with dietary fiber, which has many health and nutritional benefits.

In yet another embodiment of the present invention the fiber composition is used as a texturizing and viscosity-controlling agent in tomato based products such as ketchup and sauces as well as in spreads, soups ground meat products, and the like.

According to a further embodiment of the invention the fiber composition of the present invention is used as a syneresis-preventing agent. Adding the present composition to foods, prevents the separation of water from the food mixture.

The tomato fiber composition of the present invention is of entirely natural sources and is not chemically treated. Thus, it does not have the disadvantages of chemically treated and synthetic additives in terms of health, which is a further advantage of the present invention.

EXAMPLES

Procedure for Determining WHC 10 gr of fibers are placed in a 1000 ml beaker and 150 ml of hot water (80–90C.) are added. Followed by mixing in a high speed blender. The fibers are separated and the amount of water remaining is measured and the amount of water absorbed in the fiber is calculated. The WHC is determined as the ratio between the mass of the fibers before adding the water, and the mass of the water absorbed.

While embodiments of the invention have been described by way of illustration, it will be apparent that the invention may be carried out with many modifications, variations and adaptations, without departing from its spirit or exceeding the scope of the claims.

The invention claimed is:

1. A dietary fiber composition comprising
   dietary fibers obtained from tomato pulp,
   said composition being substantially free of carotenoids, lipids, seeds and peels,
   and wherein said dietary fiber composition exhibits a water holding capacity (WHC), in weight ratio, in the range of 1:13 to 1:60 of said dietary fiber composition to water.

2. A process for preparing the composition as described in claim 1 comprising:
   1) pretreating tomatoes by conventional unit operations which comprise washing, sorting and crushing,
   2) separating the peel and seeds of the tomato from the crushed tomatoes,
   3) subjecting the crushed tomatoes to heat treatment,
   4) separating the crushed tomatoes into serum and pulp, to obtain fine pulp,
   5) extracting carotenoids and lipids from the fine pulp obtained in step 4, and
   6) drying the extracted fine pulp obtained in step 5; and
   wherein the peels and seeds of the tomato are separated from the crushed tomatoes at any stage before said extracting and drying.

3. A process according to claim 2 wherein the extracted fine pulp is subjected to treatment in a fluidized bed dryer for removing the solvent from the extraction step and dehydrating the fine pulp.

4. A process according to claim 2 wherein the drying is at a temperature of 1000° C.–1200° C.

5. A process according to claim 2 wherein the crushed tomatoes are heated to a temperature of about 80° C.–110° C.

6. In a method comprising adding an amount sufficient for texturizing of a texturizing agent to a food, the improvement wherein the texturizing agent comprises the composition of claim 1.

7. The method of claim 6 wherein said composition is added to said food in an amount no greater than about 10% by weight.

8. The method of claim 7 wherein said composition is added in an amount of about 1% to about 5% by weight.

9. The method of claim 6 wherein said composition is added to said food in an amount no greater than about 10% by weight.

10. The method of claim 9 wherein said composition is added in an amount of about 1% to about 5% by weight.

11. The method of claim 6 wherein said food is a tomato based food product.

12. The method of claim 11 wherein said food product is ketchup or a tomato based sauce.

13. In a method comprising adding an amount sufficient of a viscosity-controlling agent to food for controlling the viscosity of said food, the improvement wherein said viscosity-controlling agent is the composition of claim 1.

14. The method of claim 13 wherein said food is a tomato based food product.

15. The method of claim 13 wherein said food is a food spread, a soup or a ground meat product.

16. In a method comprising adding an amount sufficient of a bulking agent to food for increasing the bulk of said food, the improvement wherein said bulking agent is the composition of claim 1.

17. In a method comprising adding an amount sufficient of a syneresis-preventing agent to a food product for preventing syneresis of said food, the improvement wherein said syneresis-preventing agent is the composition of claim 1.

18. The method of claim 17 wherein said composition is added to said food in an amount no greater than about 10% by weight.

19. The method of claim 18 wherein said composition is added in an amount of about 1% to about 5% by weight.

20. A process for preparing the composition as described in claim 1 comprising
   1) pretreating tomatoes by conventional unit operations which comprise washing, sorting and crushing,
   2) separating the peel and seeds of the tomato from the crushed tomatoes to obtain a crushed tomato intermediate substantially free of peels and seeds,
   3) subjecting the crushed tomato intermediate to heat treatment to obtain a heat-treated crushed tomato product,
   4) separating the heat-treated crushed tomato product into serum and pulp, to obtain fine pulp,
   5) extracting carotenoids and lipids from the fine pulp obtained in step 4, and
   6) drying the extracted fine pulp obtained in step 5.

* * * * *